Nov. 30, 1965   F. E. SMITH   3,220,267
MOTION TRANSFER DEVICE
Filed April 30, 1962   3 Sheets-Sheet 1

INVENTOR.
Floyd E. Smith
BY
Dominik, Lago & Worth
Attorneys

Nov. 30, 1965    F. E. SMITH    3,220,267
MOTION TRANSFER DEVICE
Filed April 30, 1962    3 Sheets-Sheet 2
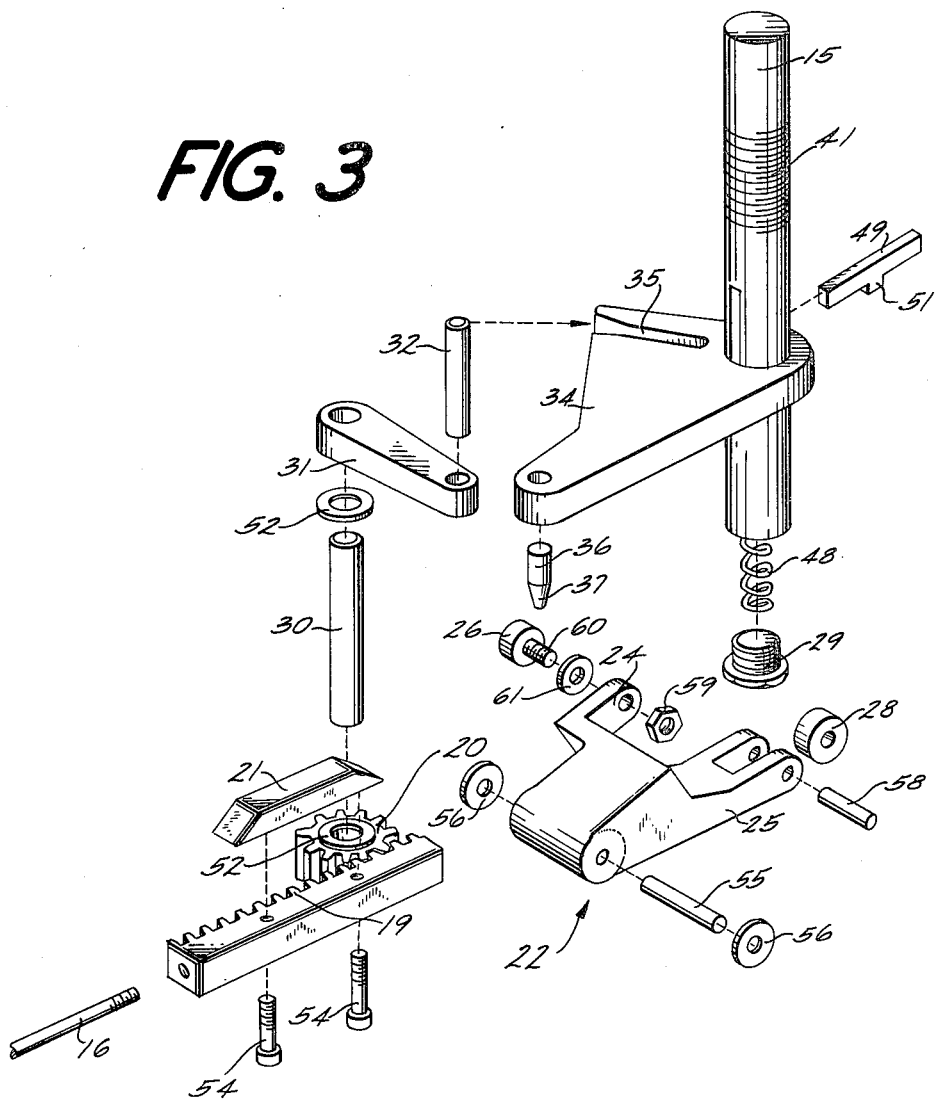
FIG. 3
FIG. 4
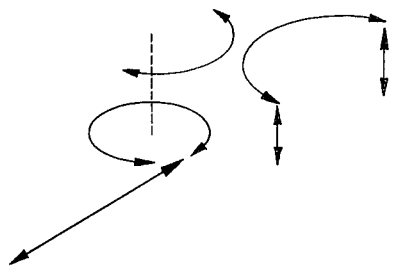
INVENTOR.
Floyd E. Smith
BY Dominik, Lago & Worth
Attorneys Nov. 30, 1965  F. E. SMITH  3,220,267
MOTION TRANSFER DEVICE
Filed April 30, 1962  3 Sheets-Sheet 3

INVENTOR.
Floyd E. Smith
BY
Dominik, Lazo & Worth
Attorneys

United States Patent Office 3,220,267
Patented Nov. 30, 1965

3,220,267
MOTION TRANSFER DEVICE
Floyd E. Smith, 3430 Glenside Ave., Erie, Pa.
Filed Apr. 30, 1962, Ser. No. 191,129
9 Claims. (Cl. 74—20)

The present invention relates to a motion transfer device, and more particularly to that type of device used in automated manufacturing systems which is capable of lifting a part from one location and moving it to another location.

In connection with the automation of assembly operations, it quite often develops that two or three basic machines conduct the entire manufacturing automatically. Nevertheless, a hand operation, or a boxing operation is required to store the parts and then subsequently transfer them to another machine. Complex feeders are often required, or hand operations at this point.

What has been lacking heretofore is a simple motion transfer device which is capable of utilizing either reciprocating or intermittent rotating motion, and transferring the same into a controlled motion which is both transferably rotatable within a plane, and also axially movable along a straight line perpendicular with the plane at the terminal points of the movement. Thus the hand operation of reaching down and picking up an item and moving it to a remote location, and then subsequently moving it downwardly and inserting requires duplication. While some devices have been proposed of this character, they oftentimes involve pneumatic, electronic, electromechanical, and other complex systems; and additionally are not widely adaptable to many applications.

It is within the foregoing in mind that the general object of the present invention is to provide a modular unit, widely adaptable to the removal and remote insertion along an axis perpendicular to the motoin transfer plane. A related object is to provide such a motion transfer device in which the actuating or power source may be either lineal or rotational, with the power applied at various locations.

Still another and related object of the invention is to provide a motion transfer device in which acceleration is applied to the motion transfer arm, but the acceleration is reduced to zero at the remote points where movement is made along an axis perpendicular with the motion transfer plane.

Still a further and more detailed object of the present invention is to furnish a motion transfer device which provides for positive orientation to very close tolerances at the removal and insertion points which terminate the intermediate transfer area. Such a device, as is further contemplated by another object of the invention, is susceptible of modification to various angles of transfer. Additionally, a further object of the invention looks to the provision of a motion transfer device in which the removal and insertion travel may be varied independently, or may be made precisely alike.

In accordance with the present invention, the foregoing and later defined detailed objects are achieved with a relatively inexpensive construction with unusual durability and trouble-free life.

A further object of the invention is to furnish a motion transfer device achieving the foregoing objects which can operate in a complete oil bath thus providing complete lubrication for long life and holding friction to the irreducible minimum while simultaneously sealing the working parts from exterior contamination.

Yet another object of the invention is to provide a motion transfer device in which the vertical adjustment is infinite within the limits of adjustability. A related object looks to the achieving of accuracy which is inherent in the design as opposed to accuracy which is achieved through precision machining and other expensive operations.

Still a further object of the present invention is to provide a motion transfer device which serves as the basis for setting up additional cyclic controls based upon its very motion. Still another object of the invention lies in the production of a motion transfer device in which over-travel and under-travel within the limits of operation are automatically compensated.

The invention may be summarized as comprehending apparatus for providing rotary and axial motion to a member, wherein the member is mounted so that it is rotatable and axially movable. The member may advantageously comprise a drive shaft on which is mounted a work piece arm, the latter being the means for effectuating the transfer of parts in an automated manner. An axial motion means, such as a cam and cam follower assembly is provided for engaging and axially moving the member or drive shaft through a predetermined axial path. Also a rotary motion means—advantageously including crank, pin, and radial driven slot part of which is secured to the drive shaft—is provided for engaging and rotatably moving the member or drive shaft through a predetermined rotational path. The apparatus further includes a means for inter-connecting the aforesaid axial motion means and rotary motion means so that one of the two motion means is driven by the other, thereby providing a synchronized, timed sequence of predetermined character whereby simultaneous rotary and axial motion of the member is achieved. Any work piece arm mounted on the member thereby responds to the simultaneous motion and travels through its complex, three-dimensional path in order to make the desired transfer. It will be appreciated that the reference to mechanisms and parts in this paragraph is for the reader's convenience in determining the appropriate part in reading the following disclosure in relation to the annexed drawings.

Various additional features may be included alone or in combination with the apparatus described in the preceding paragraph. For the sake of brevity, various means are provided alone or in combination directed to the achievement of one or the other of the objects of the invention.

Further objects, features and advantages of the present invention will become apparent as the following description of an illustrative embodiment proceeds taken in conjunction with the accompanying drawings in which:

FIG. 3 is a partially diagrammatic exploded perspective view of the principal working elements of the motion transfer device shown in FIG. 2.

FIG. 4 is a diagrammatic view illustrating the motions involved interiorly in the motion transfer device illustrated herein.

Figure 2:
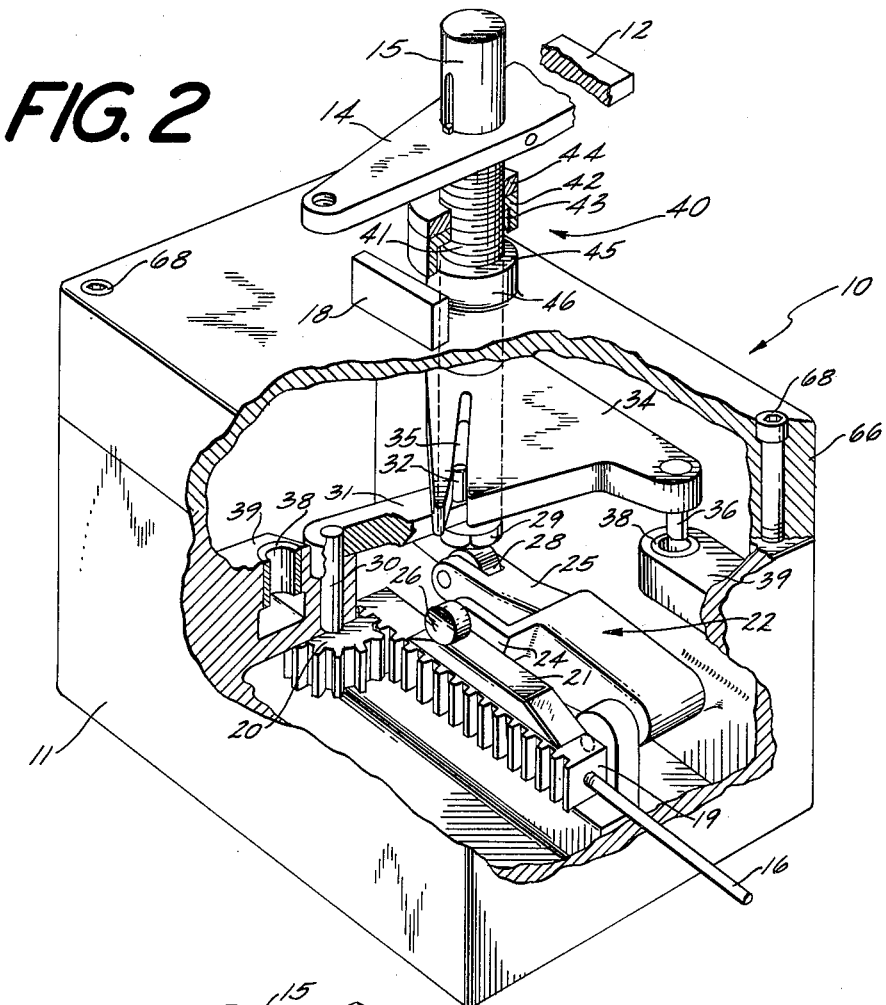
FIG. 2 is an enlarged, partially cut away perspective view of the motion transfer device shown in FIG. 1 illustrating in considerably greater detail the interior principal working elements.
Figure 1:
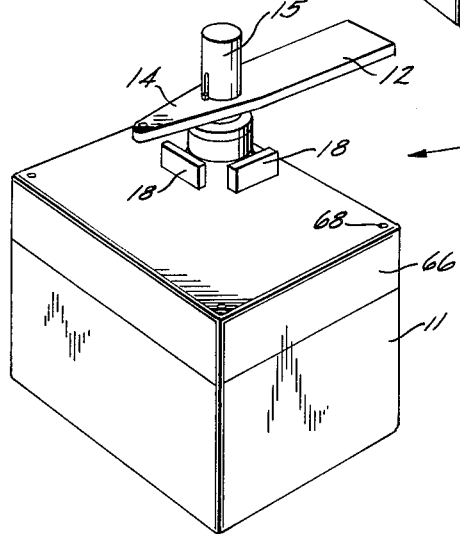
FIG. 1 is a perspective view illustrating the configuration of the motion transfer device and its associated work piece arm.

By reference to FIGURES 1 and 2 the broad outline of an exemplary embodiment of the subject invention will be readily observed. There it will be seen that a motion transfer device 10 is provided within a housing 11 having extending from the top thereof a work piece arm 12. The work piece arm 12 includes a control arm 14, both of which are fixed to the rotatable and axially movable member, drive shaft 15. The input plunger 16 actuates the rack and pinion 19, 20 and its associated cam 21, which in turn actuate the cam follower assembly 22 to selectively raise and lower the drive shaft 15. The pinion shaft 30, actuated by the pinion which is affixed thereto operates the motion transfer drive arm 31 and its associated drive pin 32 to engage the driven slot 35 of the driven arm 34, thereby rotating the drive shaft 15 in order to move the work piece arm 12 through its motion plane, while in timed relation to the intermediate motion the work piece arm 12 and the associated drive shaft 15 are lowered at the terminal points of the plane of motion. A locator pin 36 is provided at a convenient point on the driven arm 34 and engages locator bushings 38 at its terminal locations which quite precisely determines the terminal positions in which the work arm 12 moves along the axis perpendicular to the plane of motion transfer. Mounting pads 18 are provided along the housing top 66 in order to accommodate switches, solenoids, and valves which may be actuated by the motion transfer device itself to in turn activate other elements in the automated assembly.

By reference to FIG. 4, it will be seen that the motion of the rack is lineal. The input shaft or plunger 16 may be attached directly to the rack, and by moving the plunger 16 in a lineal fashion, irrespective of the source by which it is actuated, the rack moves forwardly and rearwardly transferring its motion to the pinion. The pinion, of course, moves rotationally, and actuates the drive arm 31 and its associated pin 32. This motion is transferred in sliding engagement to the large arm which in turn rotates the drive shaft 15. The cam, of a wide variety of predetermined configurations, lift, and dwell, is placed directly atop the rack and simultaneously with the motion of the rack, actuates the cam follower assembly 22 for the purpose of raising and lowering the shaft 15 independently of its rotation at pre-selected locations. It will be appreciated, of course, that the motion rather than being imparted through the input plunger 16 could similarly be imparted by an extension of pinion shaft 30 outside the housing 11 to a drive there.

It will be appreciated that drive shaft 15 is connected to a suitable transmission, such as a slider crank mechanism, which is in turn driven by an appropriate power source such as an electric motor. Further, pinion shaft 30 can be driven by reversing means such as a crank linkage or a reversing clutch and a rotationally limited (as by timing means) motor, or some other source of power providing oscillatory or harmonious rotary motion.

Referring now to FIG. 3, it will be seen that the cam follower assembly 22 includes a cam arm 24 and drive shaft arm 25 both of which have mounted thereto their respective cam follower 26 and drive shaft roller 28. A drive shaft base nut 29 is provided to threadedly engage the base of the drive shaft 15, and is actuated by drive shaft roller 28. While a roller 28 is shown, it will be appreciated that the amount of lateral travel across the drive nut 29 is negligible, and other frictional contact devices could be employed. The cam roller 26, on the other hand, should be relatively friction-free in order to roll along the surface of cam 21 as the rack 19 reciprocates along its path.

As will be observed, at a terminal portion of the driven arm 34 provision is made for the affixation of a locator pin 36. The lower triangular portion 37 is tapered in order to progressively and precisely orient the pin 36 within the locator bushings 38. In this fashion, as the cam arm 34 is lowered pursuant to the action of the cam follower assembly 22, the progressive engagement of the tapered faces of the triangular portion of locator pin 37 precisely positions the arm 12 through the angular disposition of the drive shaft 15. The locator bushing mounting bosses 39 are cast or otherwise provided in the interior portion of the housing, and permit the machining with considerable accuracy of the location of the locator bushings 38.

Another feature of the motion transfer device 10 resides in the provision of a stroke adjustment assembly 40 as will be better observed in FIG. 2. There it will be seen that the upper portion of the drive shaft 15 is provided with a threaded portion 41. To the threaded portion 41 there has been affixed in threaded engagement an adjustment nut 42 and a lock nut 44. The adjustment nut 42 is provided with an interior recess 43 which permits the adjustment nut 42 to drop downwardly and around the drive shaft journal boss 46, with the adjustment nut shoulder 45 at the upper portion of the drive shaft journal box 46 serving to engage the interior shoulder of the adjustment nut interior recess 43. By rotating the adjustment nut 42 with regard to the drive shaft 15 along the threaded portion 41, and then subsequently fixing its position with the lock nut 44, a very precise adjustment of the engagement of the nut with the housing can be provided. In this manner the lower terminus of the vertical motion of the shaft 15 and its associated arm and allied work pieces can be precisely adjusted within the limits of the motion transfer device. These limits, necessarily, are a function of the length of the threaded portion 41 of the drive shaft 15.

Figure 6:
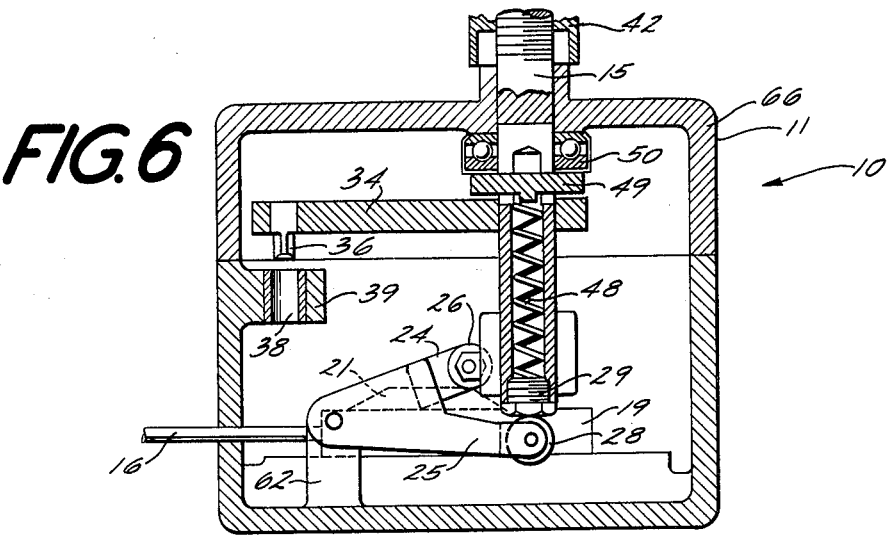
FIG. 6 is a transverse sectional view of the motion transfer device taken along section lines 6—6 of FIGS. 5 and 7.
Figure 5:
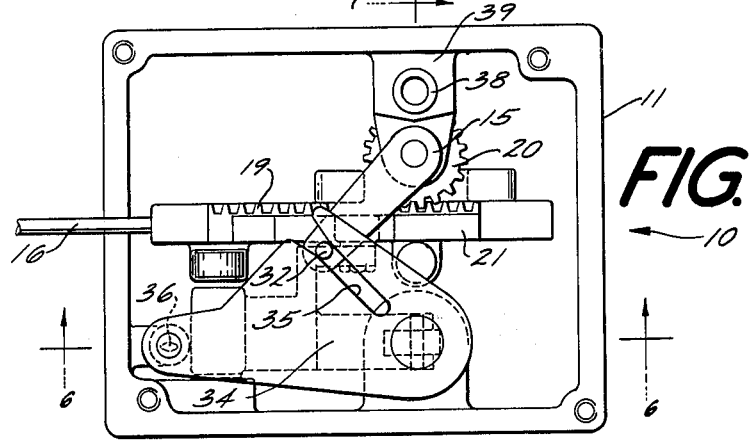
FIG. 5 is a top view of the motion transfer device with the housing top removed.
Figure 7:
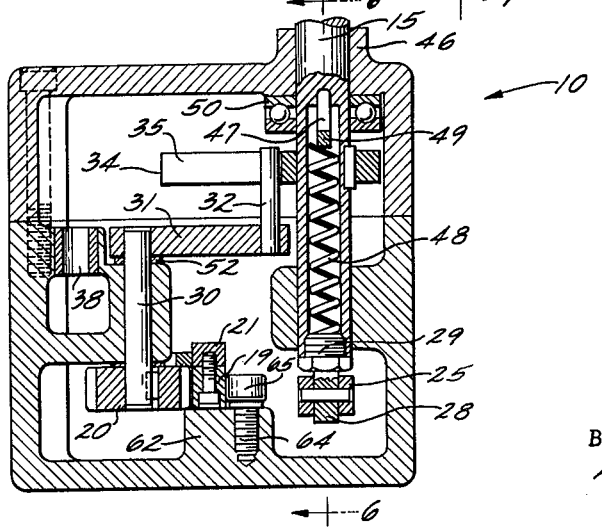
FIG. 7 is a transverse sectional view of the motion transfer device taken along section lines 7—7 of FIG. 5.

The lost motion minimization assembly works in coordinate fashion with the vertical adjustment or stroke adjustment assembly 40 as outlined above. By reference to FIG. 3, it will be seen that a compression spring 48 is provided through the interior hollow portion of the drive shaft 15. Reference to FIGS. 6 and 7 will show clearly that the compression spring 48 abuts the cross pin 49 at its upper portion. The cross pin spring locator 51 extends downwardly from a central portion of the cross pin 49 and centrally orients the compression spring 48. The other end of the compression spring abuts against the drive shaft base nut 29. The cross pin 49 extends at its ends through the drive shaft cross pin slots 47 securing at its upper portion (see FIG. 6) the thrust bearing 50. Thus in relatively simple fashion, provision is made to yieldably urge the drive shaft 15 into its downward compressive relationship with the drive shaft roller 28 at all times. This action similarly, through the cam follower assembly, urges the cam arm 24 and its associated cam follower 26 into intimate contact with the rack cam 21.

Referring again to FIG. 3, it will be seen that provision has been made for rugged construction and yet through combination with selected elements, the unit is highly adjustable, adaptable, and free of friction. The pinion shaft washer 52, for example, is provided along both ends of the pinion shaft 30 in order to respectively reduce the friction of the drive arm 31 and pinion 20 against their adjacent spacer elements. The cam follower assembly 22 is similarly pivoted for rotation by the cam follower assembly pin 55 to its adjacent mounting boss and is flanked by the cam follower assembly washers 56. In a similar manner the drive shaft roller pin is employed in order to securely position the drive shaft roller 28 within the drive shaft arm 25. The cam follower roller 26 is mounted to the cam follower threaded shaft 60 in a frictionless manner, and the threaded shaft extends through the cam arm 24 and is secured in place by the cam follower shaft lock nut 59. The washer 61 is provided to help insure against the friction of the cam follower 26 against the cam arm 24.

The rack 19 and cam 21 in their respective assembly are positioned in a positive orientation by means of the rack and cam support boss 62. Additionally, a rack roller 65 is provided on a rack roller shaft 64 (see particularly FIG. 7) so that the rack 19 is oriented in one direction by the flat surface upon which it moves, and secured laterally by its action against the pinion 20, and the roller 65.

The housing top 66 is removable as by the housing top bolts 68 as best illustrated in FIG. 2. This removal permits the unit to be fully inspected, adjusted, and lubricated with relative ease. By operating in an oil bath, and with a completely closed unit, dirt and other contaminants are sealed from entering. This oil bath similarly serves to cool the unit, and also to render it as friction free as is commensurate with the construction employed.

Having thus described one operative embodiment, it will now become apparent the wide degree of variation which is available by design to the subject device. For example, the degree of travel can be adjusted by varying the length of the drive arm 31 in coordination with the number of teeth on the pinion 20, and additionally varying the orientation of the locator bushings 38. While the present device shows 90° travel, it will be appreciated that different degrees of travel may be provided for. Necessarily the slide crank motion, beginning from a position through the opening in the slot 35 at a point of tangency to the departure of the drive pin 32 at a remote location involves a continuous acceleration and deceleration throughout its movement. This is found highly desirable in motion transfer devices as, once the work piece has been picked up, then it should be moved as swiftly as possible to the point where it is to be deposited. To further facilitate this action, it will be readily apparent that the input plunger 16 could be driven by an eccentric shaft off of a rotating mechanism which would double the potential acceleration, thereby rendering it squared in motion. Further, as already pointed out above, rotational motion can be applied directly to the pinion shaft 30 rather than reciprocating motion to the input plunger 16.

Also, in those operations where metallic interference and other problems are encountered during the motion of the work piece arm 12, it is possible to vary the exterior configuration of the cam 21 so that actually the vertical motion of the arm 12 can be varied (within the limits of design) throughout the entire length of travel of the rack 19. Also although the cam 21 and top of the rack 19 have been shown as having a similar level at either end, implying that the work piece is taken off and removed to the same plane, it is possible to vary this function as well.

Various alternative drives for transferring motion can also be applied within the unit. For example, the invention contemplates, in lieu of the rack and pinion, a crank driven cable or rod connected to an arm which slideably engages the rack. Similarly, other connecting linkages could be employed between the drive arm 31 and its associated drive pin 32 and the driven arm 34, although the most desirable relationship for commercial practices is the slide crank assembly as shown.

Although a particular embodiment of the invention has been shown and described in full here, there is no intention to thereby limit the invention to the details of such embodiment. On the contrary, the intention is to cover all modifications, alternative embodiments, usages and equivalents of the motion transfer device as fall within the spirit and scope of the invention, specification, and appended claims.

I claim:

1. A motion transfer device comprising, in combination,
    a rotatable and axially movable member,
    a driven arm fixed to said member and perpendicular therewith,
    a motion transfer drive arm,
    means for connecting the motion transfer arm and driven arm,
    lineal-rotary motion transfer means having a lineal portion and a rotary portion,
    constraining means confining the lineal portion for motion on a single fixed axis perpendicular to the rotatable and axially movable member and confining the rotary portion to rotation about a single fixed axis parallel with the rotatable and axially movable member,
    means connecting said rotary portion of the motion transfer means to the motion transfer arm,
    cam means on said lineal portion of the transfer means, and, cam follower means engaging said cam means and said movable member thereby translating the cam rise into axial movement of the movable member in timed relation to the rotation of the movable member as imparted by rotary motion of the lineal-rotary motion transfer means.

2. In a motion transfer device of the character defined in claim 1,
    movable member axial adjustment means comprising, in combination,
    a threaded portion on said member,
    an adjustment nut threadedly engaging said threaded portion, and
    stop means in fixed relation with the lineal-rotary motion transfer means engaging said adjustment nut at the termination of the axial movement of the movable member.

3. In a motion transfer device of the character defined in claim 1, positive locating means including a tapered pin extending from the driven arm, and bushings at fixed locations to receive said tapered pin upon the axial movement of the movable member.

4. A motion transfer device comprising, in combination,
    a rotatable and axially movable member,
    a slotted driven arm fixed to said movable member,
    drive arm means having a slotted driven arm engaging pin thereon for engagement with said movable member slotted driven arm,
    lineal-rotary motion transfer means having a rotary portion and a lineal portion,
    said drive arm means being connected to said rotary portion,
    cam means on said lineal portion, and
    a cam follower assembly operatively connecting the cam with the movable member to actuate the same axially in timed relation to its rotation responsive to the movement of the rotational portion of the lineal-rotary motion transfer means.

5. A motion transfer device comprising, in combination,
    a rotatable and axially movable member,
    a rack and pinion assembly,
    a cam on said rack,
    constraining means confining the pinion for rotation about a single fixed axis and confining the rack for reciprocation along a single fixed axis,
    cam follower means engaging the rack cam and engageable with the axially movable member to actuate the movable member axially,
    and slidably connected lever means interconnecting the pinion with the movable member to rotate the same responsive to the reciprocation of the rack whereby the rotation and axial movement of the movable member are a function of the rack and cam movement.

6. A motion transfer device comprising, in combination,
    a rotatable and axially movable member,
    a rack and pinion assembly,
    a cam on said rack,
    cam follower means engaging the rack cam and engageable with the axially movable member so that the cam rise correspondingly axially actuates the movable member, a slotted arm fixed to the movable member, a drive arm, slot engaging means on said drive arm, and means connecting the pinion to the drive arm whereby rack reciprocation achieves a rotation of the movable member in timed relation to the axial movement thereof imparted by the cam rise.

7. A work piece transfer device comprising, in combination, a rotatable and axially movable member having work piece pick up and release means thereon, an arm having a slot fixed to said rotatable and axially movable member, a motion transfer drive arm, slot engaging means on said drive arm, lineal motion to rotary motion transfer means having a lineal portion and a rotary portion, means connecting said rotary portion to said drive arm whereby the lineal motion of said transfer means rotates said drive arm, cam means on the lineal portion of said lineal motion to rotary motion transfer means, and cam follower means in operative engagement with the cam means and the rotatable and axially movable member whereby the lineal motion of the transfer means is converted into predetermined movement of the axially movable member in timed relation to the intermediate predetermined rotational movement thereof.

8. A motion transfer device comprising, in combination, a housing, a movable member journaled in said housing for rotational and axial movement, a rack and pinion in said housing, a drive arm connected with said pinion, a pin on said drive arm, a driven arm on said movable member and having a slot therein for operative engagement with said drive arm pin, a cam on said rack, a cam follower assembly pivoted within said housing engaging the cam and engageable with the movable member to translate the cam rise into correlative axial motion of the movable member, and means for reciprocatingly actuating said rack whereby a general indexing rotary motion is imparted to the movable member in timed relation to the axial movement of the movable member at the termination of the rotary motion thereof.

9. In a motion transfer device of the character defined in claim 8, a tapered pin extending from the driven arm, and a bushing in said housing and fixedly secured thereto for receiving the tapered pin thereby fixing the radial of the rotational limit of the movable member.

References Cited by the Examiner

UNITED STATES PATENTS

| | | | |
|---|---|---|---|
| 292,976 | 2/1884 | Bentzen | 74—20 |
| 431,319 | 7/1890 | Bell | 74—24 |
| 504,989 | 9/1893 | Minnemeyer | 74—20 |
| 1,073,075 | 9/1913 | Keck | 74—20 |
| 1,899,714 | 2/1933 | Neidich | 74—24 |
| 2,565,640 | 8/1951 | White et al. | 74—20 |
| 2,623,395 | 12/1952 | White | 74—20 |
| 2,650,503 | 9/1953 | Bacchi | 74—22 |
| 2,824,582 | 2/1958 | Reitherman | 74—109 X |
| 2,958,263 | 11/1960 | Palkowski | 74—91 X |
| 3,108,031 | 10/1963 | Hasala et al. | 74—30 X |

BROUGHTON G. DURHAM, *Primary Examiner.*